Figure 1:
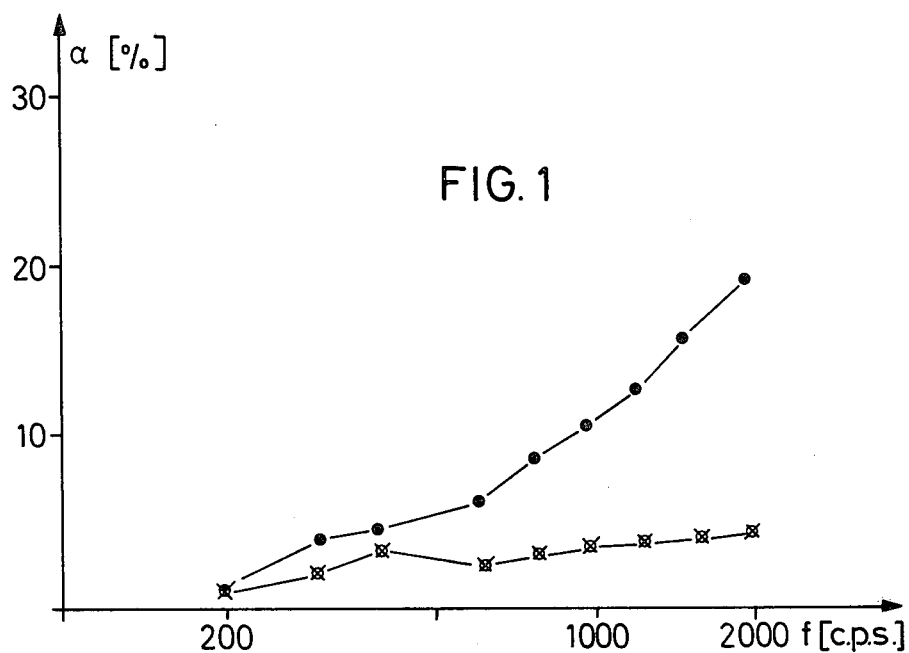

United States Patent [19]

Braunisch et al.

[11] 4,010,134

[45] Mar. 1, 1977

[54] PLASTER MIXTURE CONSISTING OF AN AQUEOUS POLYMER DISPERSION CONTAINING PIGMENT AND FILLER

[75] Inventors: Herbert Braunisch, Diedenbergen, Taunus; Heinz Lehmann, Kriftel, Taunus, both of Germany

[73] Assignee: Hoechst Aktiengesellschaft, Frankfurt am Main, Germany

[22] Filed: May 13, 1975

[21] Appl. No.: 577,090

[30] Foreign Application Priority Data

May 15, 1974 Germany ............................ 2423618

[52] U.S. Cl. .................... 260/29.6 S; 260/29.6 PS; 260/29.6 MM; 260/42.13; 260/42.22; 260/42.55
[51] Int. Cl.$^2$ .......................................... C08L 33/00
[58] Field of Search ................ 260/29.6 S, 29.6 PS, 260/29.6 MM, 42.13, 42.22, 42.55

[56] References Cited

UNITED STATES PATENTS

| | | | |
|---|---|---|---|
| 2,905,566 | 9/1959 | Schmidt et al. | 260/29.6 S |
| 3,895,018 | 7/1975 | Adolf | 260/29.6 S |

OTHER PUBLICATIONS

Meanes, *Polymers, Structure ı Bulk Properties*, D. Van Nostrand, London, 1965, pp. 251–260.

*Primary Examiner*—M. J. Welsh
*Attorney, Agent, or Firm*—Curtis, Morris & Safford

[57] ABSTRACT

The sound absorbing properties of plasters, based on synthetic resin emulsions as binders, are improved, if as binder dispersions are used the polymer content of which has a dilatometrically determined second order transition temperature of between −20° C and +10° C, and if the fillers consist of at least 70% of material having a grain-size of from 0.35 to 1.5 mm.

5 Claims, 6 Drawing Figures

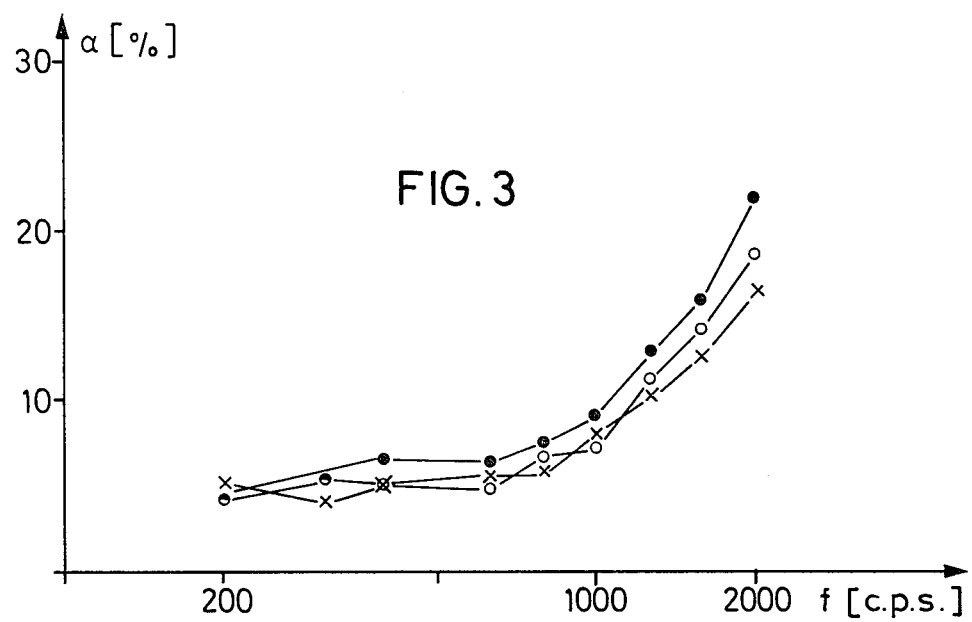
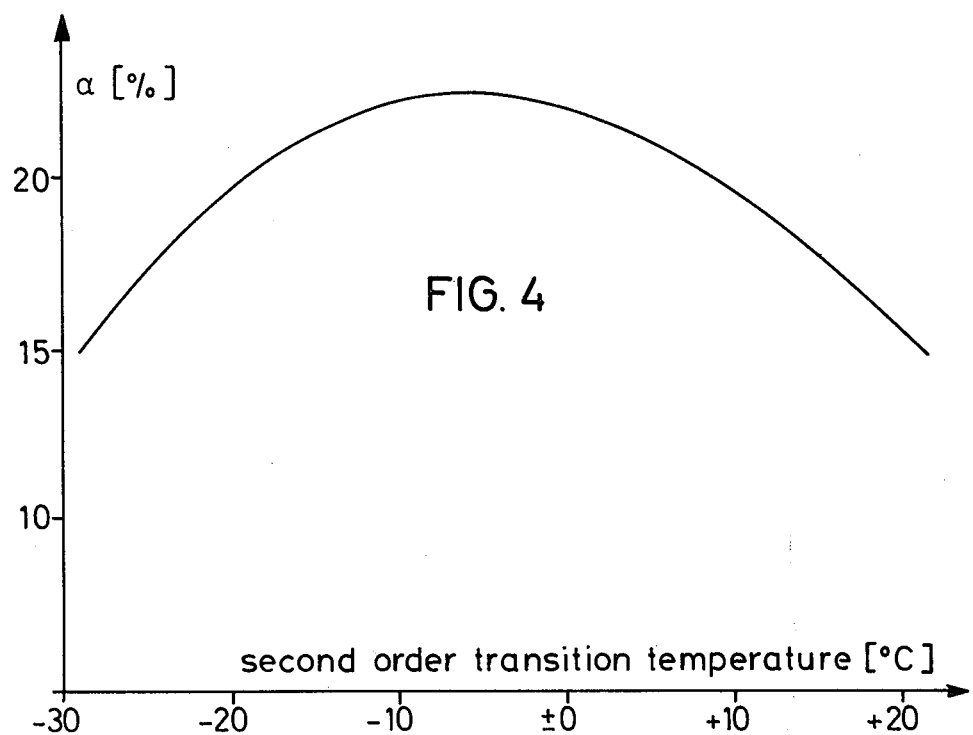

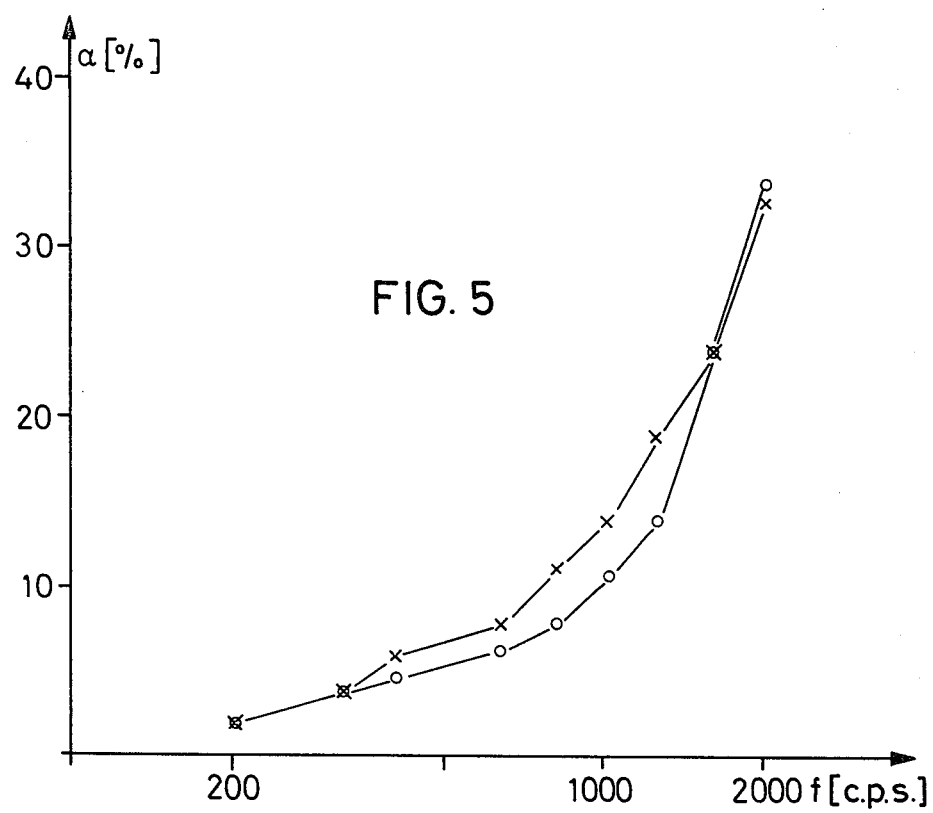
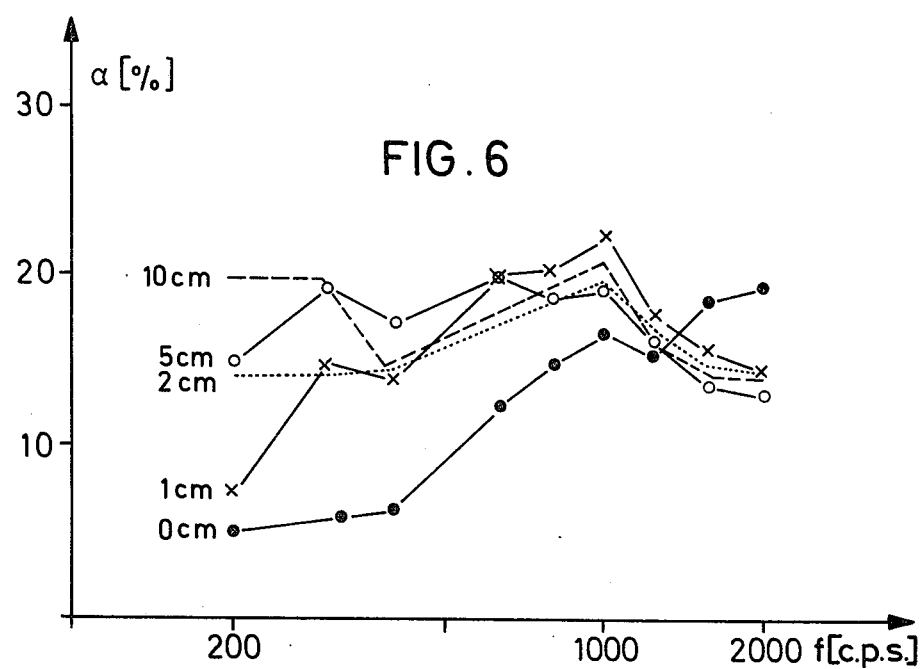

PLASTER MIXTURE CONSISTING OF AN AQUEOUS POLYMER DISPERSION CONTAINING PIGMENT AND FILLER

The present invention relates to a plaster mixture for preparing sound absorbing synthetic resin-based plasters.

Plasters are mortar coverings applied to walls and ceilings in one or several layers and containing besides dyestuffs and fillers lime and/or cement or plastics dispersions as binding agents. The latter plasters are also called synthetic resin-based plasters. Plasters are applied both to outer walls and inner walls and ceilings of buildings such as dwelling houses, gymnasia, underground stations etc. for protecting and embellishing them. Plasters generally are not used for reducing the sound level owing to the fact that the sound absorption values of the plasters are too low for this purpose.

Sound absorbers are agents wherein the sound propagation is deadened to a considerable extent, the deadening being produced by absorption, i.e. by conversion into heat. The sound absorption degree $\alpha$ is defined as the fraction of the energy of the arriving wave which is not reflected:

$$\alpha = 1 - r^2,$$

wherein $r$ is the reflected amplitude.

A higher sound absorption of the plasters is, however, desired wherever the coated walls or ceilings limit rooms having perpetually or periodically a high sound level and where communication difficulties are thus produced. By an improved sound absorption the sound level is reduced and the reverberation time is diminished. In this way the sound level may be considerably reduced in busy streets, street tunnels, halls, inns and restaurants, gymnasia and swimming pools, underground stations, stair case wells etc. and on the other hand the acoustics in churches, concert halls, habitations etc. may also be considerably improved.

Effective arrangements for improving the sound absorption are known. Generally, relatively thick layers of mineral wool are used or layers of open-pore foamed plastics being generally covered by perforated wooden, metal or plastics plates as well as resonator arrangements. These rather effective materials are relatively thick and are mostly used only for ceilings, with the exception of measuring rooms.

It is also known to apply plasters to wire supports that are fitted below the ceiling at a certain distance. The sound absorption is improved owing to the greater distance to the wall, especially in the case of low frequencies.

The invention is concerned with the problem of improving the sound absorption of resin based plasters to such a degree that the wall coated with the plaster appreciably influence the sound level and the reverberation time. The large surfaces coated with plaster thus act as sound absorbers and make additional technical expenditures unnecessary. The walls and ceilings remain in their original state, while the noise level in rooms and halls, underground stations, staircase wells etc. is considerably reduced.

In the case of an acoustic wave arriving vertically at a completely reflecting wall it may be noticed that its velocity directly at the wall is zero and that the greatest velocity amplitudes are found at a distance of $\alpha/4$ from the wall. Energy losses occur only if there exists a movement of the particles, owing to the fact that the sound absorption is produced by friction of the air in the pores or the elements of the skeleton of the absorber. As the velocity at the wall is zero, only limited absorption values can be obtained in the case of a thickness of the layer of a few millimeters usual for plasters. A thickness of the layer of $\alpha/4$ would be ideal.

| frequency (c.p.s.) | $\alpha/4$ (cm) |
|---|---|
| 100 | 82.5 |
| 500 | 16.5 |
| 2000 | 4.1 |

The plasters exhibit little absorpten at low frequencies the absorption improving with increasing frequency. Owing to the fact that the greatest ear sensivity is at about 1000 c.p.s. and that the sound is reflected several times before reaching the ear, while arriving most frequently obliquely, thereby increasing the apparent thickness of the layer and consequently the absorption, conventionally applied sound absorbing plasters may also considerably reduce the exposure to noise. The effect is improved by applying the plasters at a certain distance from the wall.

In order to demonstrate the sound absorption values obtained with the usual resin based plasters FIG. 1 shows the absorption values of two conventional plasters. It can be seen that the absorption values in the frequency range examined are all below 5%.

The sound absorption values were determined according to DIN 52,215 (DIN = German industrial standard) in an impedance tube in the case of a vertical sound incidence. Prior to measuring the samples were dried for 7 days at room conditions and for 16 hours at 60° C. The plaster mixtures to be examined generally were applied to asbestos cement plates having a diameter of 96 mm, the thickness of the layer being 4 mm.

Higher values may as well be obtained with the known sound absorbers. FIG. 1 illustrates also the sound absorption of a mineral wool of a thickness of 4 mm applied to asbestos cement. Mineral wool is regarded as a good sound absorber. It can be seen that the sound absorption is improved with increasing frequency, without surpassing a value of 20% up to a frequency of 2000 c.p.s. .

The present invention consequently provides a plaster mixture for preparing sound absorbing resin-based plasters consisting of an aqueous polymer dispersion, pigments, mineral fillers and further commonly used additives, wherein the polymer in said dispersion has a dilatometrical second order transition temperature of from −20 to +10° C and wherein at least 70% by weight of the pigment or filler portion has a granular size of form 0.35 to 1.5 mm.

The aqueous polymer dispersions used are knwon dispersions of homo- or copolymers of ethylenically unsaturated compounds such as vinyl esters, acrylic and methacrylic acid esters, styrene, ethylene or vinyl chloride. As suitable pigments there may be used suitable organic or mineral pigments, preferably titanium dioxide. Fillers to be used are, for example, quartz- or calcium carbonate. Further usual additives used in the plaster mixtures are thickening agents, wetting and dispersing agents, defoamers, film forming auxiliaries such as plasticizers or solvents and preservatives.

It has become evident that the distribution of the granular sizes of the fillers and the properties of the binding agent, i.e. of the polymer dispersions, are of decisive importance for the sound absorption of the plasters. Size, depth and distribution of the pores in the plaster depend on the distribution of the particle sizes of the fillers, and the elasticity and the deadening of the skeleton on the binding agent. As the sound absorption is produced by friction in the pores, the friction depending on the size, number and form of the pores as well as on the visco-elastic data of the walls, said influence is quite understandable.

It has been noticed that a dilatometrical second order transition temperature, i.e. the second order transition temperature at an indefinitely slow heating rate in the range of from −20° C and +10° C is advantageous for a high sound absorption. The sound absorption is diminished when increasing or reducing the second order transition temperature.

Particles of a diameter of more than 1.5 mm may be dispensed with in the case of sound absorbing plasters. Particles of a diameter of from 0.35 to 1.5 mm are absolutely indispensable however. A mixture of particle fractions of from 0.35 to 0.7 mm and of from 0.7 to 1.5 mm in proportion of from 30/70 to 70/30% by weight is preferably used. A mixture of said particle fractions in a proportion of 50:50 has proved particularly advantageous. The use of a fine grain of a diameter of less than 0.35 mm is more critical since there exists a series of types of filling agents of varying grain diameters and the pigment, preferably titanium dioxide, acts as a portion of very fine particles. It is advisable to prepare mixtures having varying portions of fine grain, and to determine the optimum values by measuring the sound absorption. If crystalline calcium carbonate, for example, of an average diameter of 0.13 mm is used as fine grain, the suitable proportion of medium grain (of from 0.35 to 1.5 mm) and fine grain (of a diameter of less than 0.35 mm) is 2:0.4.

The portion of the particles having a diameter of from 0.35 to 1.5 mm should be at least 70% by weight however.

It is likewise possible to add to the plaster mixtures known sound absorbers in a fine distribution (for example mineral wool) or porous materials such as expanded mica, melamine resin foamed powder, spherules of foamed polystyrene or perlites in an amount of up to 30% by weight calculated on the portion of pigments and fillers for improving the sound absorption. It has been noticed that these additives improve the sound absorption, in cases where the grain structure has not yet been adjusted to an optimun degree with regard to the absorption. The additives have the same effect as if the portion of the medium grain had been increased and considerable improvements in the sound absorption may be obtained.

Frequently liquid additives such as film forming auxiliaries or preservatives are added to the plaster mixtures. These substances partly act as plasticizers, thus reducing the second order transition temperature. Plaster mixtures having a second order transition temperature in a range outside of that favorable for the sound absorption before adding said substances may get a favorable temperature range when adding said substances. Some additives however start to dissolve the polymer. It has become apparent that high concentrations of these additives cause a reduction of the sound absorption, owing to the fact that the plaster has less and smaller pores.

A further essential improvement of the sound absorption of plasters may be obtained, if the plaster does not adhere homogeneously to the wall, but if there are zones of good and of bad adherence so that some zones of the plaster in the sound field may vibrate simultaneously like a membrane. Thus a considerable deadening is produced by means of the vibrating membrane in addition to the deadening in the pores, as sound energy is transformed thereby. It is however important that there exist continuous pores.

By this resonator effect sound absorption values of more than 30% at 2000 c.p.s. may be easily obtained. For realizing the varying adherence, plastics ribbons, for example, may be fixed to the walls to be plastered vertically from the ceiling to the floor and horizontally fixed at only a few points.

A further possiblity for improving the sound absorption of resin-based plasters especially at low frequencies consists in applying the plasters at a certain distance from the wall. For this purpose a screen cloth for example may be fixed at a distance of some centimeters from the wall and the plaster may be applied thereto.

The following examples illustrate the invention.

EXAMPLE 1

Conventional resin-based plaster mixtures were prepared in usual manner according to the following recipes, parts being by weight:

RECIPE 1

180.0 parts of polymer dispersion, solids content about 50% dilatometric second order transition temperature −5° C
0.5 parts of concentrated ammonia (of 25%)
70.0 parts of aqueous 5% cellulose ether solution
1.0 parts of defoamer
44.0 parts of titanium dioxide of an average diameter of about 0.4 $\mu$m
25.0 parts of crystalline calcium carbonate of a grain diameter of from 2 to 20 $\mu$m
18.0 parts of extremely fine quartz powder of an average grain diameter of 5 $\mu$m
207.0 parts of quartz sand of a grain diameter of from 0.1 to 0.35 mm
243.0 parts of quartz sand of a grain diameter of from 0.35 to 1 mm
108.0 parts of quartz gravel of a grain diameter of from 0.7 to 1.2 mm, round grain
90.0 parts of quartz gravel of a grain diameter of from 1.2 to 2.4 mm, round grain
2.0 parts of preservative
9.5 parts of white spirit
2.0 parts of butyldiglycol acetate.

RECIPE 2

270.0 parts of polymer dispersion, solids content of about 50%, dilatometric second order transition temperature of −5° C
1.0 parts of concentrated ammonia (of 25%)
62.0 parts of water
2.0 parts of defoamer
46.0 parts of 10% solution of sodium hexametaphosphate
2.0 parts of 2.5% solution of cellulose ether 65.0 parts of titanium dioxide of an average grain diameter of about 0.4 μm
45.0 parts of chinaclay of an average diameter of about 2 μm
60.0 parts of crystalline calcium carbonate of an average grain diameter of about 14 μm
47.0 parts of crystalline calcium carbonate of a grain diameter of from 2 to 20 μm
197.0 parts of quartz sand of a grain diameter of from 0.1 to 0.35 mm
143.0 parts of quartz sand of a grain diameter of from 0.35 to 1 mm
37.0 parts of quartz powder of an average diameter of about 50 μm
3.0 parts of butyldiglycol acetate
2.0 parts of preservative
18.0 parts of white spirit Recipe 1 contains coarse grains for structure formation by rubbing when applying the plaster to the wall. Recipe 2 is a fine resin-based plaster having a grain size up to 1 mm and being applied by spreading. Both plaster mixtures were applied to asbestos cement plates of a thickness of 4 mm in a layer of about 4 mm by rubbing or spreading, dried at room temperature for 7 days and subsequently at a temperature of 60° C for 16 hours. The sound absorption values determined in the impedance tube are shown in FIG. 1. It can be seen that the sound absorption values in the examined frequency range remain below 5%.

The following two recipes show sound absorbing plasters according to the invention, parts being by weight:

RECIPE 3

153.0 parts of polymer dispersion of a solids content of about 53% dilatometric second order transition temperature of −2° C
0.5 parts of concentrated ammonia (of 25%)
6.8 parts of water
22.3 parts of 2% cellulose ether solution
68.0 parts of 10% solution of sodium hexametaphosphate
38.5 parts of titanium dioxide of an average diameter of about 0.4 μm
384.8 parts of crystalline calcium carbonate of a graim diameter of from 0.7 to 1.5 mm
384.8 parts of crystalline calcium carbonate of a grain diameter of from 0.35 to 0.7 mm
1.8 parts of butyldiglycol acetate

RECIPE 4

157.9 parts of polymer dispersion of a solids content of about 53%, dilatometric scond order transition temperature of −2° C
0.5 parts of concentrated ammonia (of 25%)
7.0 parts of water
22.9 parts of 2% cellulose ether solution
7.0 parts of 10% solution of sodium hexametaphosphate
13.2 parts of titanium dioxide of an average diameter of about 0.4 μm
328.9 parts of crystalline calcium carbonate of a grain diameter of from 0.7 to 1.5 mm
328.9 parts of crystalline calcium carbonate of a grain diameter of from 0.35 to 0.7 mm
131.9 parts of crystalline calcium carbonate of an average diameter of 0.13 mm
1.8 parts of butyldiglycol acetate.

Figure 2:
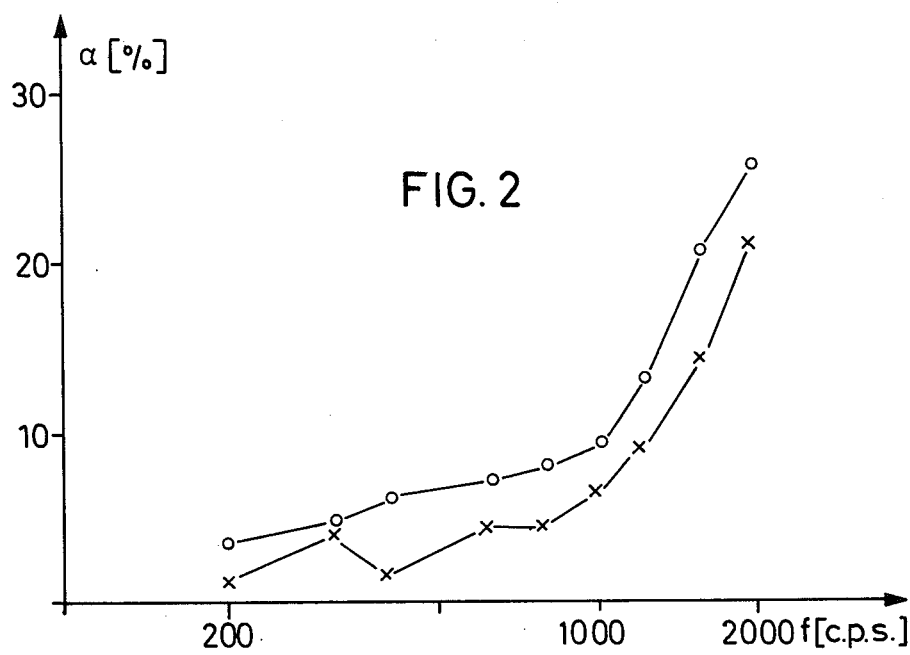

The plaster mixtures were spread on asbestos cement plates in a thickness of the layer of 4 mm, dried as described above and the data were determined. The absorption values are shown in FIG. 2. It can be seen therefrom that the sound absorption values are considerably improved. 25% of absorption at 2000 c.p.s. were obtained when using recipe 3, 21% of absorption at 2000 c.p.s. when using recipe 4. These values were higher than with a layer of mineral wool of equal thickness. Good acoustic plasters do not have coarse grains (diameter of more than 1.5 mm) and the portion of fine grain (diameter of less than 0.35 mm) is low. When adding calcium carbonate of an average diameter of 0.13 mm according to recipe 4, a part of titanium dioxide may be dispensed with.

EXAMPLE 2

For determining the influence of the second order transition temperature three plasters containing varying polymer dispersions were prepared according to the following recipes, parts are by weight

RECIPES 5 to 7

139.1 parts of polymer dispersion of a solids content of about 53%
0.5 parts of concentrated ammonia (of 25%)
6.1 parts of water
20.2 parts of 2% cellulose ether solution
6.1 parts of 10% solution of sodium hexametaphosphate
34.5 parts of titanium dioxide of an average diameter of about 0.4 μm
344.8 parts of crystalline calcium carbonate of a grain diameter of from 0.7 to 1.5 mm
344.8 parts of crystalline calcium carbonate of a grain diameter of from 0.35 to 0.7 mm
89.7 parts of crystalline calcium carbonate of an average grain diameter of 0.13 mm
1.6 parts of butyldiglycol acetate
11.6 parts of preservative of 10% in toluene.

The dilatometric second order transition temperatures of the three different polymer dispersions after film formation were
+1° C (recipe 5)
+18° C (recipe 6)
−22° C (recipe 7)

The plaster mixtures were applied in usual manner on asbestos cement plates, the thickness of the layer being 4 mm, dried and then examined in the impedance tube. FIG. 3 illustrates the sound absorption values. It can be seen from FIG. 4 that the highest sound absorption values were obtained in a temperature range of from −20° C to +10° C.

EXAMPLE 3

This example illustrates the improvement of the sound absorption in case that the plaster does not adhere to the support at some places and consequently is capable of vibrating in the sound field. Plaster mixtures were prepared according to the following recipes, parts being by weight

RECIPES 8 and 9

146.4 parts of polymer dispersion of a solids content of about 53% and of a dilatometric second order transition temperature of −2° C
0.5 parts of concentrated ammonia (of 25%)
28.2 parts of water 21.2 parts of aqueous 2% solution of cellulose ether
6.5 parts of 10% solution of sodium hexametaphosphate
26.6 parts of titanium dioxide
366.1 parts of crystalline calcium carbonate of a diameter of from 0.7 to 1.5 mm
366.6 parts of crystalline calcium carbonate of a diameter of from 0.35 to 0.7 mm
24.4 parts of perlite (recipe 8) or spherules of foamed polystyrene of a diameter of about 1 mm (recipe 9)
1.7 parts of butyldiglycol acetate
12.3 parts of preservative of 10% in toluene These plaster mixtures were applied to asbestos cement plates in a thickness of the layer of 3 mm, whereupon polyethylene ribbons of a width of 4 cm had been placed in a reticulous manner at intervals of 2 cm and fixed at the edges of the plate. From FIG. 5 it can be seen that the sound absorption values at 2000 c.p.s. were increased to more than 30%.

EXAMPLE 4

A plaster mixture was prepared according to recipe 4 of Example 1, applied to a fine-meshed wire of a mesh width of about 1 mm in a thickness of the layer of 3 mm and the plaster was examined with regard to its sound absorption at different distances from an acoustically inert wall. FIG. 6 shows the results obtained. It can be clearly seen that the sound absorption at low frequencies was increased. In case that low frequencies are present in the sound spectrum good sound absorption at low frequencies is more important than high absorption values at higher frequencies.

The invention is illustrated diagrammatically by way of example in the accompanying drawings.

REMARKS ON THE DRAWINGS

FIG. 1: sound absorption of
o plaster according to recipe 1 on asbestos cement, thickness 4 mm
x plaster according to recipe 2 on asbestos cement, thickness 4mm
· mineral wool on asbestos cement, thickness 4 mm
FIG. 2: sound absorption of
o plaster according to recipe 3 on asbestos cement, thickness 4 mm
x plaster according to recipe 4 on asbestos cement, thickness 4 mm
FIG. 3: sound absorption of
· plaster according to recipe 5 on asbestos cement, thickness 4 mm
x plaster according to recipe 6 on asbestos cement, thickness 4 mm
o plaster according to recipe 7 on asbestos cement, thickness 4 mm
FIG. 4: sound absorption of plasters in the case of 2000 c.p.s. depending on the second order transition temperature of the polymer dispersion
FIG. 5: sound absorption of
x plaster according to recipe 8 on asbestos cement, of a bad adherence, thickness 3mm
o plaster according to recipe 9 on asbestos cement of a bad adherence, thickness 3 mm
FIG. 6: sound absorption of plaster according to recipe 4, applied to a wire mesh of a mesh width of 1 mm; thickness of the plaster 4 mm, at varying distances from a hard wall.

What is claimed is:

1. In a plaster composition for preparing sound absorbing resin-based plasters consisting essentially of an aqueous polymer dispersion containing pigments and mineral fillers, the improvement which comprises using a dispersion polymer having a dilatometric second order transition temperature of $-20°$ C. to $+10°$ C. and a mixture of pigment and filler of such a grain size that 70% by weight of the mixture has a grain size of 0.35 to 1.5 mm.

2. A composition according to claim 1 wherein the filler comprises 30 to 70% by weight of material having a grain size of 0.35 to 0.7 mm and 70 to 30% by weight of material having a grain size of 0.7 to 1.5 mm.

3. A plaster composition according to claim 1 and containing in addition to pigment and mineral filler up to 30% by weight, based on the total weight of pigment and filler, of an additive selected from mineral wool, expanded mica, melamine resin foamed powder, spherules of foamed polystyrene, perlite and mixtures thereof.

4. A process for applying the plaster composition of claim 1 to a wall or ceiling to form a layer of plaster thereon which comprises inhibiting the adherence of the plaster to some areas of the wall to improve the sound absorbtivity of the plaster layer.

5. A process for applying the plaster composition of claim 1 to a wall or ceiling to form a sound absorptive plaster layer which comprises forming the plaster layer at a predetermined distance from the wall to improve the sound absorbtivity of the plaster layer.

* * * * *